Jan. 4, 1955
C. TITTL
2,698,474
FISH POLE HOLDER
Filed Feb. 24, 1950
2 Sheets-Sheet 1
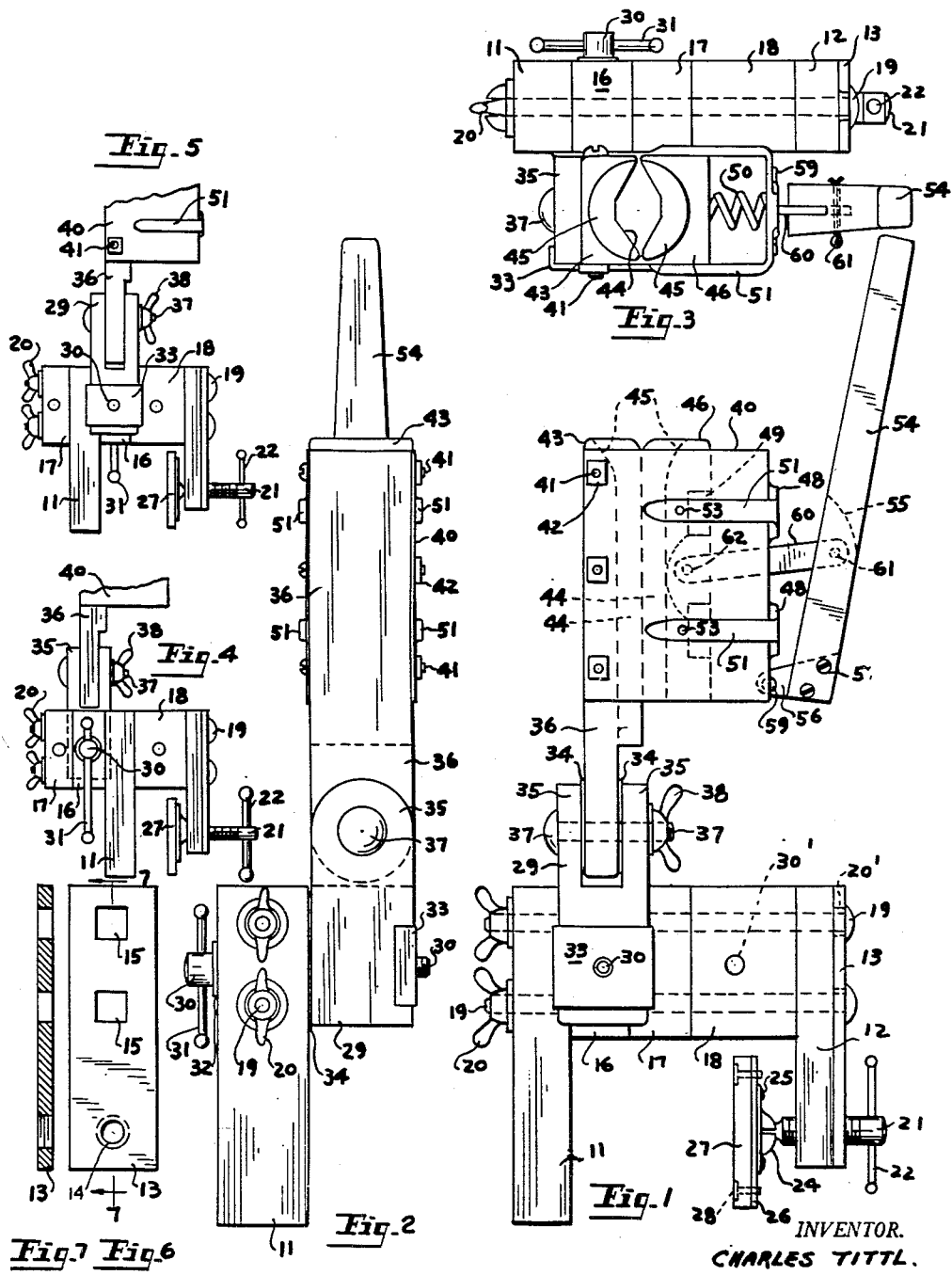
INVENTOR.
CHARLES TITTL.
BY
Robert A. Sloman
ATTORNEY Jan. 4, 1955  C. TITTL  2,698,474
FISH POLE HOLDER
Filed Feb. 24, 1950  2 Sheets-Sheet 2
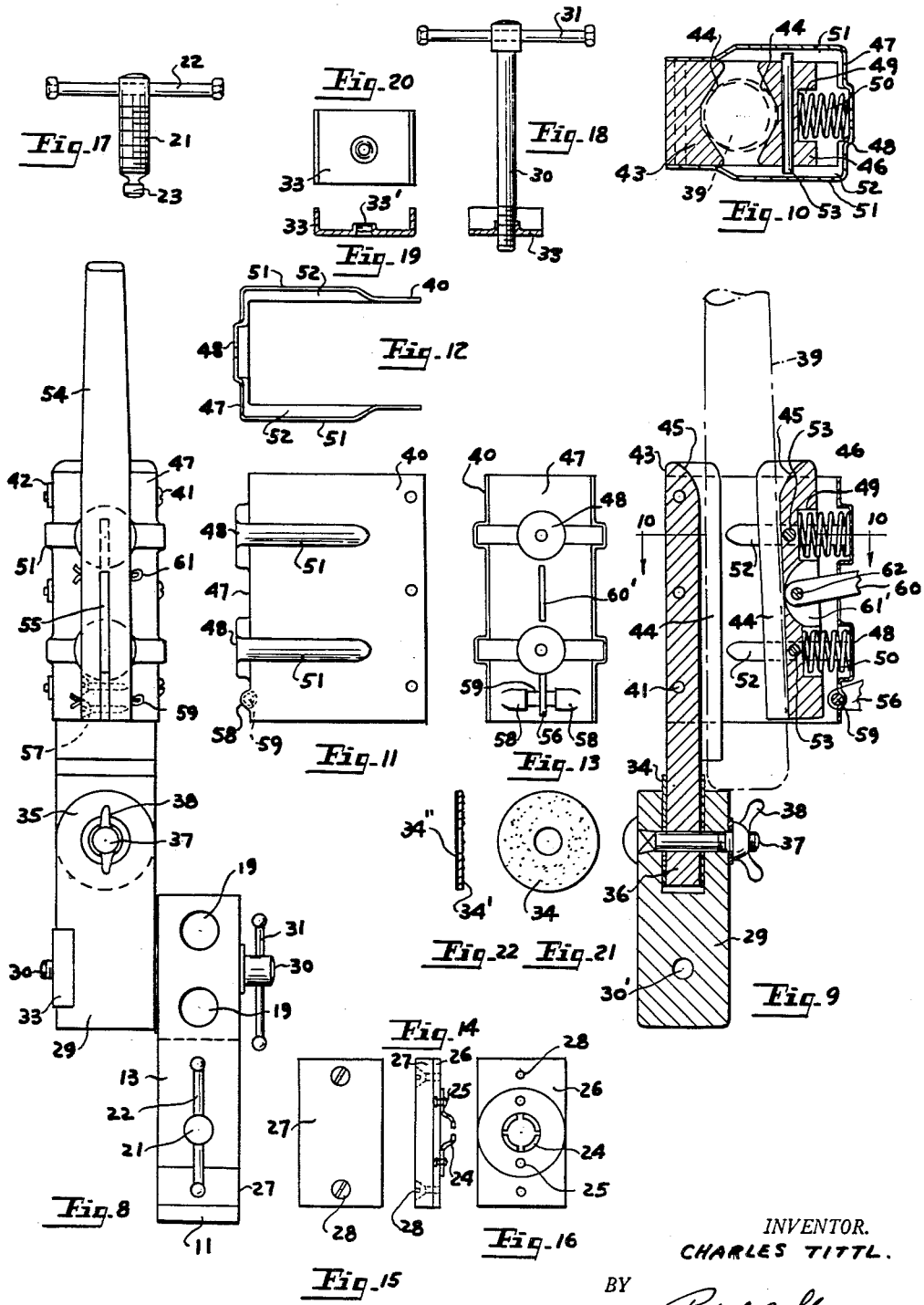
INVENTOR.
CHARLES TITTL.
BY
Robert A. Sloman
ATTORNEY.

United States Patent Office 2,698,474
Patented Jan. 4, 1955

2,698,474

FISH POLE HOLDER

Charles Tittl, Detroit, Mich.

Application February 24, 1950, Serial No. 146,083

1 Claim. (Cl. 24—257)

This invention relates to a fish pole holder construction, and more particularly to a fish pole holder and a suitable clamp for mounting the same upon a part of the boat or upon a wharf, together with swivel mounting means interposed between the holder and the clamp to permit universal adjustments of said holder with respect to said clamp.

It is the object of the present invention to provide in a fish pole holder construction a pair of fish pole receiving grips, one of which is laterally adjustable with respect to the other, to receive the fish pole, there being provided suitable resilient means for normally urging said adjustable grip towards the stationary grip.

It is the further object of the present invention to provide a substantially simplified fish pole holder which is inexpensive to manufacture and which is fully effective for the purpose intended.

These and other objects will be seen from the following specification and claim in conjunction with the appended drawings in which:

Fig. 1 is a side elevational view of the present fish pole holder.

Fig. 2 is a left end view thereof.

Fig. 3 is a plan view thereof.

Fig. 4 is a fragmentary side elevational view thereof with a slight variation in the arrangement of the supporting clamp.

Fig. 5 is a similar view showing still another variation in the arrangement of the supporting clamp.

Fig. 6 is a front elevational view of the clamp plate.

Fig. 7 is a section on line 7—7 of Fig. 6.

Fig. 8 is a right end view of the holder shown in Fig. 1.

Fig. 9 is a side elevational view partially broken away and sectioned showing the holder expanded to receive a fish pole, but with the clamp omitted.

Fig. 10 is a section on line 10—10 of Fig. 9.

Fig. 11 is a right side elevational view of the grip housing shown in Fig. 8.

Fig. 12 is a plan view thereof.

Fig. 13 is an end elevational view of said housing.

Fig. 14 is a side elevational view of the adjustable jaw of said clamp.

Fig. 15 is a left end elevational view thereof.

Fig. 16 is a right end elevational view thereof.

Fig. 17 is an elevational view of the screw for said clamp.

Fig. 18 is an elevational view of the adjustable screw which interconnects said clamp and the swivel upon which the holder is mounted, together with the co-operating nut which is shown in section.

Fig. 19 is a section view of said nut.

Fig. 20 is a plan view thereof.

Fig. 21 is an elevational view of the friction washer used in conjunction with the swivel connections between said plan and said holder; and Fig. 22 is a side elevational view thereof.

It will be understood that the above drawings illustrate merely a preferred embodiment of the invention, and that other embodiments are contemplated within the scope of the claim hereafter set out.

Referring to Fig. 1 the present fish pole holder is shown which includes the supporting clamp consisting of the stationary jaw 11 and the base 12 spaced therefrom. Members 11 and 12 are preferably constructed of wood, but could be made from a fibre or light metal such as aluminum, and the interior portion of jaw 11 may be formed to coincide with the shape of the object upon which the clamp will be mounted. Rectangular metallic plate 13 with square bolt head receiving openings 15 and threaded opening 14, is positioned upon the outer surface of base 12 and is secured with respect thereto by the pair of bolts 19 shown in Fig. 1. A plurality of interchangeable and removable spacers 16, 17 and 18 are interposed between said base and the stationary jaw 11, there being suitable wing nuts 20 and washers arranged at the threaded ends of bolts 19 for securing the clamp assembly together.

Bolts 19 have rectangular portions 20' adjacent their heads for cooperative positioning within openings 15 in the plate 13, and the base 12 has a threaded portion in alignment with threaded opening 14 of said plate in order to receive the manually adjustable bolt 21 with operating handle 22.

As shown in Fig. 17 the opposite end of screw 21 has a substantially spherical shape portion 23 which is inserted within the swivel 24, Fig. 1, the latter being secured by rivets 25 to the plate 26. Furthermore plate 26 is joined to the adjustable jaw 27 of said clamp by the screws 28, as also illustrated in Figures 14, 15 and 16.

The member 29 is arranged upon one side or the other of the clamp and is pivotally joined to one of the spacers 16, 17 or 18 as shown in Fig. 1 or 5 by means of the transverse threaded bolt 30 with operating handle 31. Said bolt extends through corresponding openings 30' in one of said spacers and through a corresponding opening in the member 29, and also through a securing nut 33 as illustrated in Figs. 1, 2, 18, 19 and 20, a suitable washer 32 being interposed between the head of bolt 30 and the spacer.

One or more friction washers 34, as illustrated in detail in Figures 21 and 22 are interposed between the corresponding walls of said clamp and the adjacent spacer such as spacer 16. The washers 34 are constructed preferably of paper or cloth and have an abrasive surface 34' which may be particles of sand or emery suitably bonded thereto, or may be otherwise roughened to increase the frictional relation between the pivotally joined parts. Furthermore the opposite surface of said washer may also be roughened as set out above, or on the other hand said surface may have thereon a glue or other adhesive 34".

The upper end of member 29 is bifurcated at 35, being adapted to receive the downwardly extending portion 36 of the stationary grip 43 of the fish pole holder hereafter described in detail. Bolt 37 extends transversely through the bifurcated portions 35 of said swivel and through a corresponding opening in the lower end of depending grip element 36. Wing nut 38 is threaded upon the opposite end of said bolt and is adjustably secured thereon for effectively locking grip element 36 in any desired angular position within the upper end of swivel 29. Here also a pair of friction washers 34 are mounted upon the bolt 37 and interposed between opposite sides of grip element 36 and the adjacent inner walls of the bifurcations 35, to thereby substantially increase the frictional relationship between said elements whereby grip element 36 may be secured in any desired angular position.

Hollow metallic grip housing 40, Figs. 1, 2, 11, 12, and 13, is substantially U shaped and the elongated stationary grip 43 is positioned within and adjacent the open portion of said housing, being secured therein by the transverse bolts 41 and the nuts 42 as shown in the drawings. It is apparent that this stationary grip depends downwardly as at 36 below said housing whereby the latter is swivelly or pivotally joined to the swivel 29 as by the bolt 37.

A substantially V shaped longitudinal slot 44 is formed within the inner surface of the stationary grip 43 to cooperatively engage a portion of the fish pole 39 as shown in Fig. 9, the outer end of said V slot being outwardly tapered at 45 to facilitate the entry of said fish pole within the supporting grips.

There is also provided within said housing a similarly shaped laterally adjustable grip 46 which is arranged in parallel relation to stationary grip 43, grip 46 also having an interior longitudinal slot 44 of substantially V shape which cooperates with the corresponding slot in grip 43, to thereby provide a recess of variable width to receive the lower end of fish pole 39 as shown in Fig. 9. Grip 46 also has a tapered portion 45 at its outer end which cooperates with the corresponding tapered portion of grip 43.

Housing 40 has an upright end wall 47 with a pair of vertically spaced outwardly projecting circular bosses 48 formed therein, and corresponding slots 49 are formed within the outer wall of grip 46 as shown in Figs. 1, 9 and 10. Coiled springs 50 are interposed between said housing and laterally adjustable grip 46 with their one ends nested and retained within the bosses 48 and with their opposite ends nested and retained within the recesses 49, whereby the adjustable grip 46 is continuously urged by said springs into cooperative relationship with stationary grip 43 to effectively secure the lower end of fish pole 39 between said grips.

Vertically spaced outwardly projecting hollow bosses 51 are formed within the sides of housing 40 defining the interior transverse guide slots 52, Fig. 12, into which extend the opposite free ends of the transverse supporting and guide pins 53 which extend through said laterally movable grip 46. By this construction grip 46 is supported within housing 40 and at the same time the slots 52 within the bosses 51 serve as guides for the ends of the grip supporting pins 53.

The lever 54 has a central longitudinal slot 55 at its lower end which receives therein mounting plate 56 secured thereto by the screws or bolts 57. As shown in Fig. 13 a pair of outwardly projecting bosses 58 are formed within the lower portion of housing 40, being adapted to receive and support the ends of the pin 59 upon which plate 56 is pivotally mounted as shown in the drawings.

There is also provided a link 60 which extends through an upright slot 60' in said housing, with one end extending into slot 55 and pivotally joined to lever 54 as by the transverse cotter pin 61. The opposite end of the link 60 extends within an upright slot 61', Fig. 9, in adjustable grip 46, being pivotally joined thereto by the transverse pin 62.

By this construction it is apparent that manual outward movement of lever 54 will effect a lateral outward movement of the grip 46 with respect to grip 43 either to permit insertion or withdrawal therefrom of the lower end of the fish pole 39 fragmentarily shown in Fig. 9. As the pole is generally tapered, it is seen that due to the yielding support of grip 46 in view of the springs 50, the said grip will properly align itself with said tapered surface in the manner shown in Fig. 9.

Having described my invention reference should now be had to the following claim for determining the scope thereof.

I claim:

In a fishpole holder, an upright elongated hollow housing having side walls and a slotted end wall, an upright elongated stationary grip secured within said housing, an upright elongated movable grip mounted within said housing adapted for lateral adjustments relative to said stationary grip, the inner opposing longitudinal surfaces of said grips having substantially V shaped slots to retainingly receive a fishpole, said surfaces terminating in outwardly tapered portions at their upper ends to facilitate insertion of said fishpole, a plurality of vertically spaced coiled springs interposed between said movable grip and said housing end wall normally urging said grip towards said stationary grip, there being a pair of vertically spaced recesses in said movable grip cooperatively and supportably receiving the front ends of said springs, said housing end wall having a pair of vertically spaced outwardly projecting hollow bosses adapted to supportably receive the outer ends of said springs, vertically spaced transverse pins extending through said movable grip with their free protruding ends cooperatively engaging said housing side walls for supporting said movable grip and guiding its transverse adjustments, said side walls having a pair of horizontally arranged vertically spaced outwardly projecting bosses defining internal transverse slots to cooperatively and guidably receive the ends of said pins, a lever pivotally joined at its lower end to the lower end of said housing end wall, and a link extending through the slot in said end wall interconnecting intermediate portions of said lever and said movable grip, whereby the movable grip may be manually adjusted laterally away from said stationary grip against said springs to permit insertion of a fishpole between said grips.

References Cited in the file of this patent

UNITED STATES PATENTS

| Number | Name | Date |
|---|---|---|
| 75,750 | Gridley | Mar. 24, 1868 |
| 78,252 | Batchelder | May 26, 1868 |
| 122,370 | Doolittle | Jan. 2, 1872 |
| 134,431 | Johnson | Dec. 31, 1872 |
| 246,836 | Taylor | Sept. 6, 1881 |
| 655,951 | Bates | Aug. 14, 1900 |
| 760,598 | Wynegar | May 24, 1904 |
| 947,282 | Hall | Jan. 25, 1910 |
| 1,054,063 | Warren | Feb. 25, 1913 |
| 1,162,608 | Hohl et al. | Nov. 30, 1915 |
| 1,457,029 | Hazlett | May 29, 1923 |
| 1,534,642 | Hoagland | Apr. 21, 1925 |
| 1,611,101 | Day | Dec. 14, 1926 |
| 1,941,728 | Wilkenson | Jan. 2, 1934 |
| 2,243,388 | Magyarosi | May 27, 1941 |